United States Patent
Khan et al.

(10) Patent No.: US 12,249,892 B2
(45) Date of Patent: Mar. 11, 2025

(54) COOLING JACKET FOR COOLING PERMANENT MAGNET SYNCHRONOUS ELECTRIC MOTOR

(71) Applicant: VINFAST TRADING AND PRODUCTION JOINT STOCK COMPANY, Hai Phong (VN)

(72) Inventors: Mohammad Naeem Khan, Hai Phong (VN); The Quynh Nguyen, Hai Phong (VN); Van Hoan Nguyen, Hai Phong (VN); Van Tho Nguyen, Hai Phong (VN)

(73) Assignee: VINFAST TRADING AND PRODUCTION JOINT STOCK COMPANY, Hai Phong (VN)

( * ) Notice: Subject to any disclaimer, the term of this patent is extended or adjusted under 35 U.S.C. 154(b) by 142 days.

(21) Appl. No.: 18/080,246

(22) Filed: Dec. 13, 2022

(65) Prior Publication Data
US 2023/0268795 A1 Aug. 24, 2023

(30) Foreign Application Priority Data
Feb. 23, 2022 (VN) ............................. 1-2022-01123

(51) Int. Cl.
*H02K 5/20* (2006.01)
*H02K 1/20* (2006.01)
(Continued)

(52) U.S. Cl.
CPC ............... *H02K 5/203* (2021.01); *H02K 1/20* (2013.01); *H02K 5/1732* (2013.01); *H02K 9/193* (2013.01)

(58) Field of Classification Search
CPC .. H02K 9/00; H02K 9/18; H02K 9/19; H02K 9/193; H02K 5/00; H02K 5/15;
(Continued)

(56) References Cited

U.S. PATENT DOCUMENTS

| | | | | |
|---|---|---|---|---|
| 3,060,335 A | * | 10/1962 | Greenwald | ............ H02K 5/203 310/58 |
| 2013/0038151 A1 | * | 2/2013 | Ohashi | ................... H02K 7/086 310/59 |
| 2020/0295628 A1 | * | 9/2020 | Reichert | ................ H02K 5/203 |

FOREIGN PATENT DOCUMENTS

| | | | | |
|---|---|---|---|---|
| CN | 104247229 A | * | 12/2014 | ............ H02K 5/203 |
| WO | WO 2005078900 A1 | * | 8/2005 | ............ H02K 5/203 |

* cited by examiner

*Primary Examiner* — Tran N Nguyen
(74) *Attorney, Agent, or Firm* — United One Law Group LLC; Kongsik Kim; Jhongwoo Peck

(57) ABSTRACT

The present invention relates to a cooling jacket for cooling a permanent magnet synchronous electric motor, wherein the cooling jacket comprises bearing housing cooling portion and a stator cooling portion, wherein the stator cooling portion comprises stator coolant guiding channel having an enlarged middle section. The flow splitter having a shape that corresponds to the enlarged middle section is disposed at the middle of this enlarged section. The flow splitter has the same height as that of the partition wall, and the upper surface of the flow splitter is curved to form a seal with the inner surface of the stator outer housing. At the middle of the stator coolant guiding channel, there is provided a middle rib that extends in the spiral shape around the circumference of the stator cooling portion. The middle rib has a lower height than the height of the partition wall.

4 Claims, 14 Drawing Sheets

(51) Int. Cl.
*H02K 5/173* (2006.01)
*H02K 9/19* (2006.01)
*H02K 9/193* (2006.01)

(58) Field of Classification Search
CPC .. H02K 5/16; H02K 5/18; H02K 5/20; H02K 5/203; H02K 1/20
USPC .......................... 310/58–60 R, 60 A, 64, 65
See application file for complete search history.

COOLING JACKET FOR COOLING PERMANENT MAGNET SYNCHRONOUS ELECTRIC MOTOR

CROSS-REFERENCE TO RELATED APPLICATION

This application claims priority from Vietnamese Application No. 1-2022-01123, filed on Feb. 23, 2022, which is incorporated herein by reference in its entirety.

TECHNICAL FIELD

The present invention relates to an cooling jacket for cooling the permanent magnet synchronous electric motor (PMSM) in order to increase the heat transfer from the electric motor to the coolant, increase the heat transfer coefficient and decrease the overall temperature of the electric motor cooling system.

RELATED ART

Electric motor converts the electrical energy into the mechanical energy and vice versa in power generation mode. Electric motor is mainly assembled from four main assemblies that are stator assembly, rotor assembly, cooling assembly, and motor housing assembly. During operation, electric motor generates heat, which is required to be dissipated to prevent the motor stator, winding, bearing, rotor, magnet, etc. from being overheated, thus safely protect such assemblies. If this heat does not dissipate efficiently, it will result in an increment to the temperature of the assemblies and may lead to the efficiency degradation of the machine as well as premature failure of the machine.

The method of using a cooling jacket for cooling the electric motor is commonly used in the existing known electric motors to dissipate the heat generated by the electric motor. This existing known cooling jacket is a component which surrounds the stator and has fluid passages for the coolant to flow for cooling the stator of the electric motor.

The above stator assembly in the electric motor is comprises a stator core and copper windings surrounding the stator core. The above motor housing assembly comprises a main stator housing, a rear stator housing and a resolver housing and other components. The main stator housing comprises a stator outer housing, a cooling jacket, and a bearing housing.

The heat generated in the stator copper winding and the stator core is dissipated away radially into the cooling jacket that comprises spiral passage engraved therein and covered by stator outer housing. The coolant comes from the inverter cooling path, which is connected in series with the motor assembly cooling jacket, and enters into the cooling jacket. Then, the coolant circulates into the cooling jacket and flows out to the bearing cooling assembly and after that to the outlet of the motor assembly.

The fluid passage allows the coolant to flow from inlet to outlet that takes away the heat via forced convection heat transfer mechanism.

The Chinese Utility Model No. CN208862672U (see FIG. 1A, FIG. 1B) discloses the configuration that improves the cooling effect by means of cooling water of the stator of the ISG motor, comprises a cylindrical housing 100 and a cooling water guiding channel 101 disposed in the housing wall and the cooling water guiding channel 101 has a spiral shape. The cooling water guiding channel 101 comprises a main cooling water guiding channel 102 having a spiral shape and a plurality of grooves 103 having a spiral shape which are recessed below the inner surface of the main cooling water guiding channel 102. The adjacent grooves 103 are disposed parallel to each other, and the groove surface 103 is smoothed. Thereby the cooling water passes through grooves 103 and main cooling water guiding channel 102 in a cross-flow manner. There are at least three parallel grooves 103 disposed in the inner surface of the main channel 102 and the main channel 102 has a rectangular or trapezoidal cross-section.

The Chinese Patent Application Publication No. CN105990945A (see FIG. 2) discloses a cooling jacket for motor provided with an inner sleeve-shaped portion 201, a housing portion 202, a plurality of end covers 203, and a plurality of cooling water inlets 204, a cooling water outlet 205. The inner sleeve-shaped portion 201 has partition walls extending spirally outwardly and are hermetically engaged with outer housing portion 202 forming the cooling water guiding channel. Between the two partition walls there is a rib having a lower height than the height of the partition wall. Thereby the cooling water passes through the upper portion of the cooling water guiding channel and through the grooves between the walls and the ribs in a cross-flow manner.

Although the aforementioned known solutions disclosed the arrangement of grooves or ribs inside the coolant/cooling water guiding channel in order to increase the contact surface of the cooling jacket with the coolant/cooling water and generate the coolant/cooling water flow passing through the upper portion of the coolant/cooling water guiding channel and through the grooves inside the coolant/cooling water guiding channel in a cross-flow manner. However, these prior arts have disadvantages in that the flow distribution is not optimized and the local heat accumulation, results in the heat transfer coefficient and the cooling efficient are not high.

SUMMARY

An objective of the present invention is to increase the heat transfer from the electric motor to the coolant, increase the heat transfer coefficient and decrease the overall temperature of the electric motor cooling system.

To achieve the above-mentioned objective, according to an aspect of the invention, there is provided a cooling jacket for cooling the permanent magnet synchronous electric motor, wherein the permanent magnet synchronous electric motor comprises a stator outer housing substantially in the form of a hollow cylinder surrounding the cooling jacket which is also substantially in the form of a hollow cylinder; a stator core in the form of a hollow cylinder located inside the cooling jacket; a rotor is rotatably mounted inside the stator core, the stator outer housing has an end portion configured to form a bearing housing of the motor, characterized in that the cooling jacket comprises a bearing housing cooling portion and the stator cooling portion, wherein the stator cooling portion comprises an outer wall located on the outer end side and an inner wall located on the inner end side thereof, a partition wall that extends in the spiral shape around the circumference of the stator cooling portion, and is connected with the outer wall and the inner wall at one end and the other end, respectively, wherein the partition wall, the outer wall, and the inner wall is in hermetically contact with the inner surface of the stator outer housing and together forming a stator coolant guiding channel; the middle section of the stator coolant guiding channel is enlarged, at the middle of the enlarged section there is provided a flow splitter having a shape that corresponds to the enlarged middle section, the flow splitter has the same height as that of the partition wall and the upper surface of the flow splitter is curved to form a seal with the inner surface of the stator outer housing; and at the middle of the stator coolant guiding channel having a middle rib that extends in the spiral shape around the circumference of the stator cooling portion, the middle rib comprises a front rib portion and a rear rib portion, wherein the front rib portion extends substantially parallel with the partition wall from the coolant inlet to a position located between the partition wall and a side surface of the flow splitter, the rear rib portion extends substantially parallel with the partition wall from a position located between the partition wall and an opposite side surface of the flow splitter to the coolant outlet, the middle rib has a lower height than the height of the partition wall.

According to an aspect of the invention, at least one O-ring is disposed to form a seal between the bearing housing cooling portion and the stator cooling portion; and at least one O-ring is disposed to form a seal between the stator cooling portion and the stator outer housing.

According to an aspect of the invention, the bearing housing cooling portion comprises an outer wall located on its outer end side; an arc-shaped groove is formed in the front surface of the bearing housing cooling portion; a concave groove is formed in the inner surface of the stator outer housing, wherein the concave groove, the circumferential surface of the bearing housing cooling portion, the front surface of the bearing housing cooling portion, and the arc-shaped groove together forming a bearing coolant guiding channel; wherein the coolant follows the bearing coolant guiding channel flows across the outer wall toward the front surface of the bearing housing cooling portion, flows into the arc-shaped groove to increase the bearing housing cooling effect, then continues to flow along the concave groove in the front surface of the bearing housing cooling portion and passes through the discharging pipe to the outside.

According to an aspect of the invention, the middle rib of the stator coolant guiding channel has a lower height than the height of the partition wall by 0.5 mm.

BRIEF DESCRIPTION OF DRAWINGS

In order to facilitate the understanding of the invention, a preferred embodiment of the invention, without limiting the invention, will be described with reference to the accompanying drawings, wherein.

DETAILED DESCRIPTION

Figure 1A:
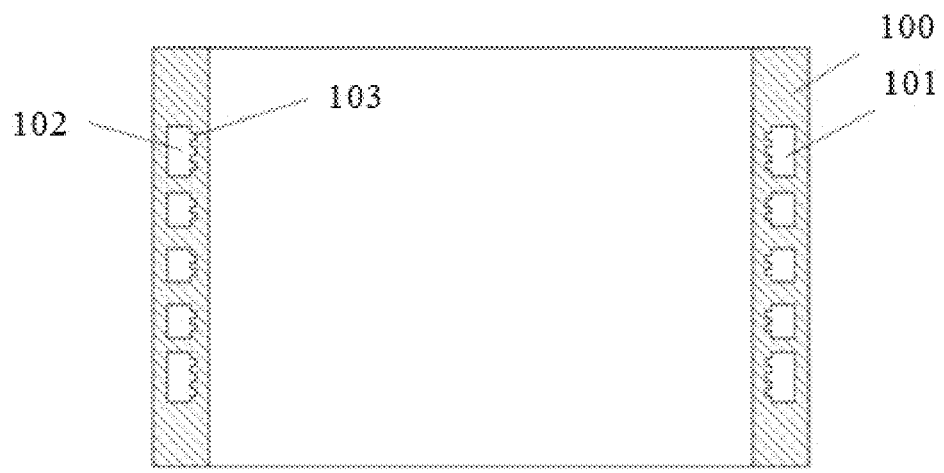
FIG. 1A is a schematic cross-sectional view showing a configuration of a known type of the electric motor cooling jacket.
Figure 1B:
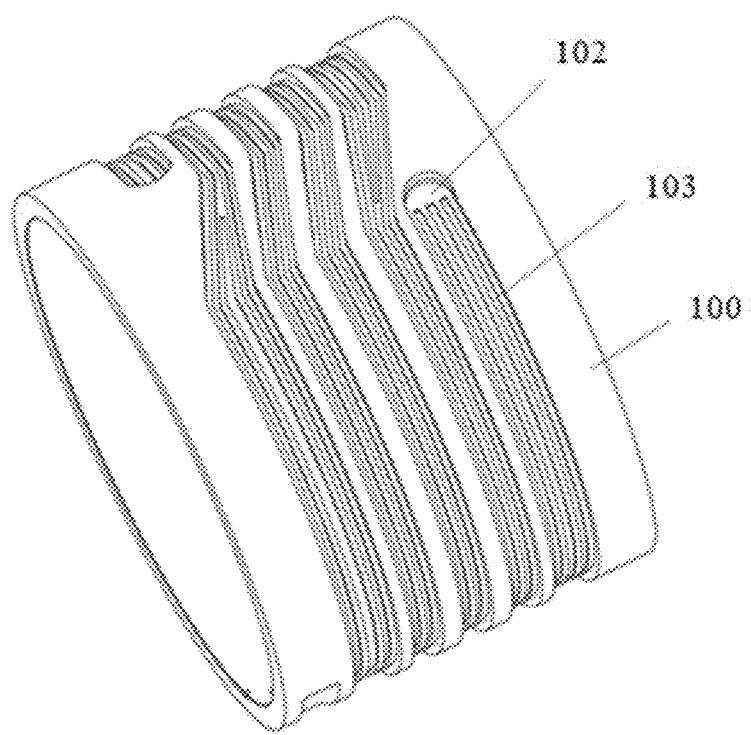
FIG. 1B is a perspective view illustrating a partial configuration of a known electric motor cooling jacket in FIG. 1A.
Figure 2:
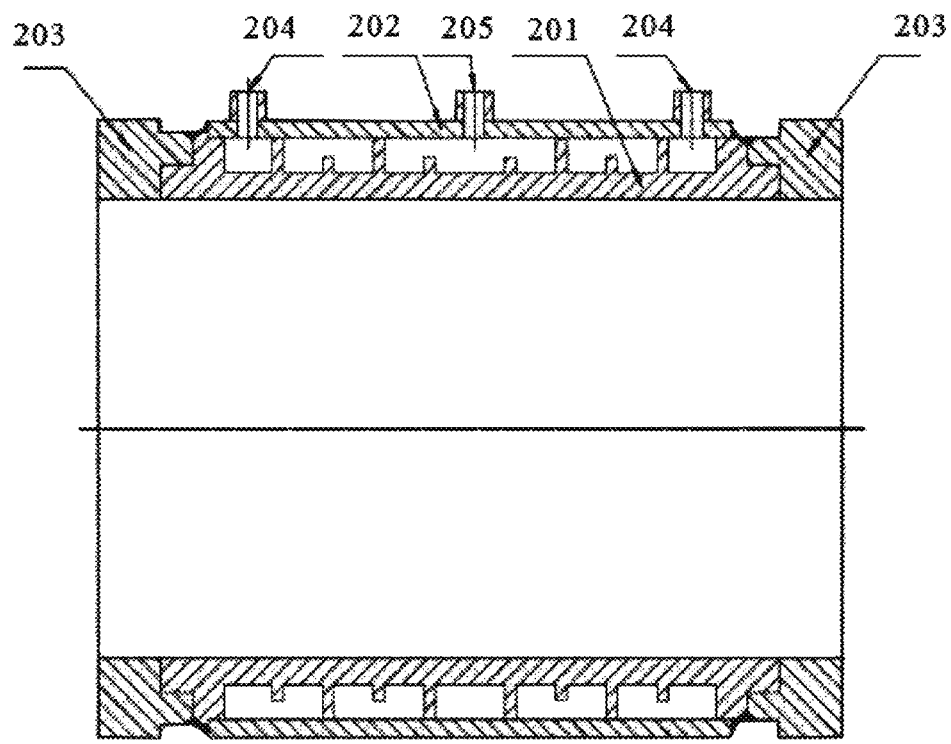
FIG. 2 is a schematic cross-sectional view showing a configuration of another known electric motor cooling jacket.
Figure 3:
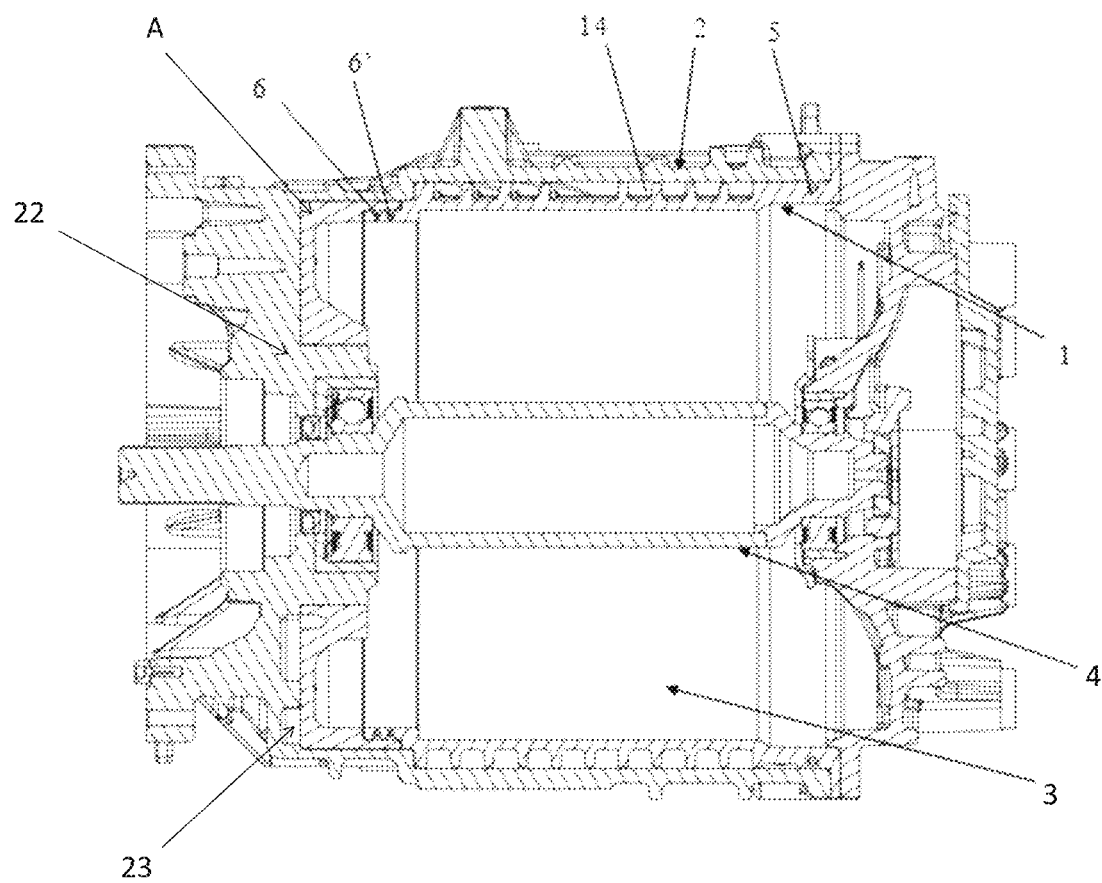
FIG. 3 is a schematic cross-sectional view of the permanent magnet electric motor using the cooling jacket in order to increase the heat transfer from the electric motor to the coolant, increase the heat transfer coefficient and decrease the overall temperature of the electric motor cooling system according to an embodiment of the invention.
Figure 4:
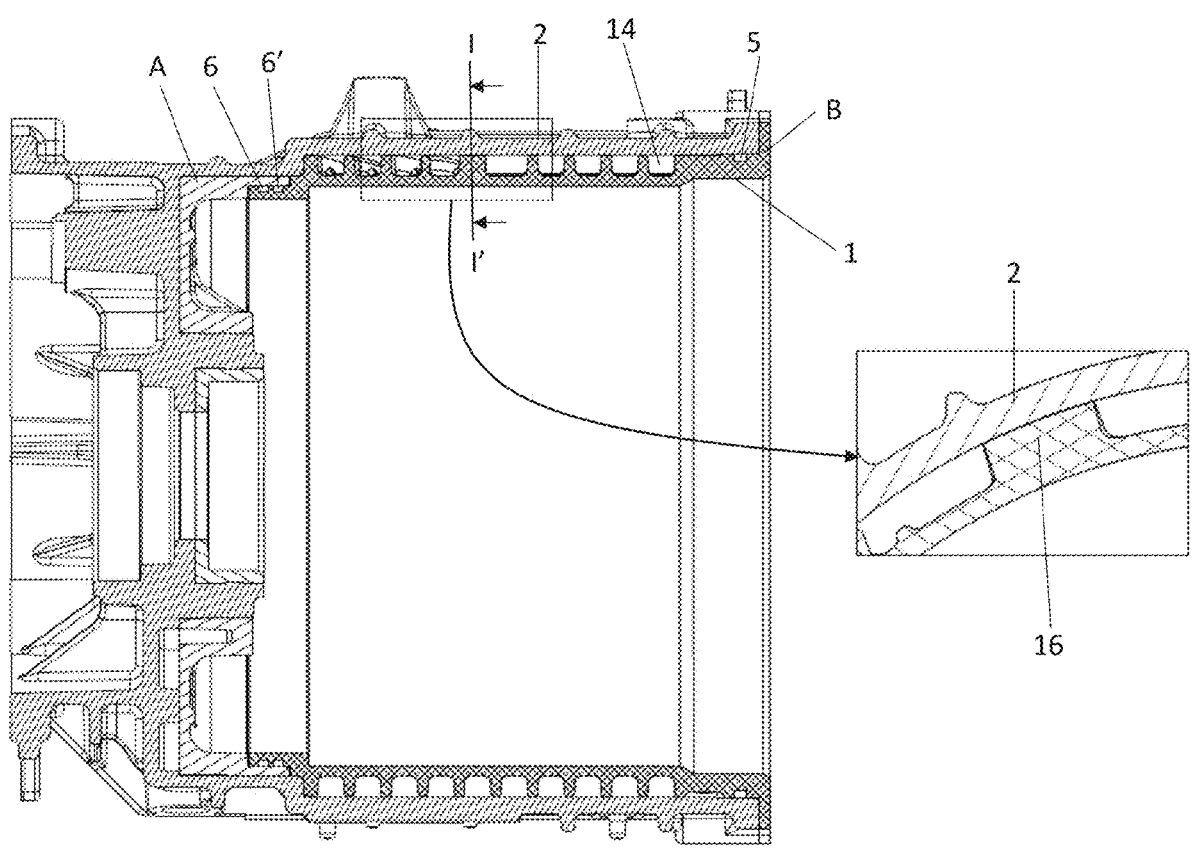
FIG. 4 is a schematic cross-sectional view showing the connection between the stator outer housing of permanent magnet electric motor and the cooling jacket according to the embodiment of the invention.
Figure 5:
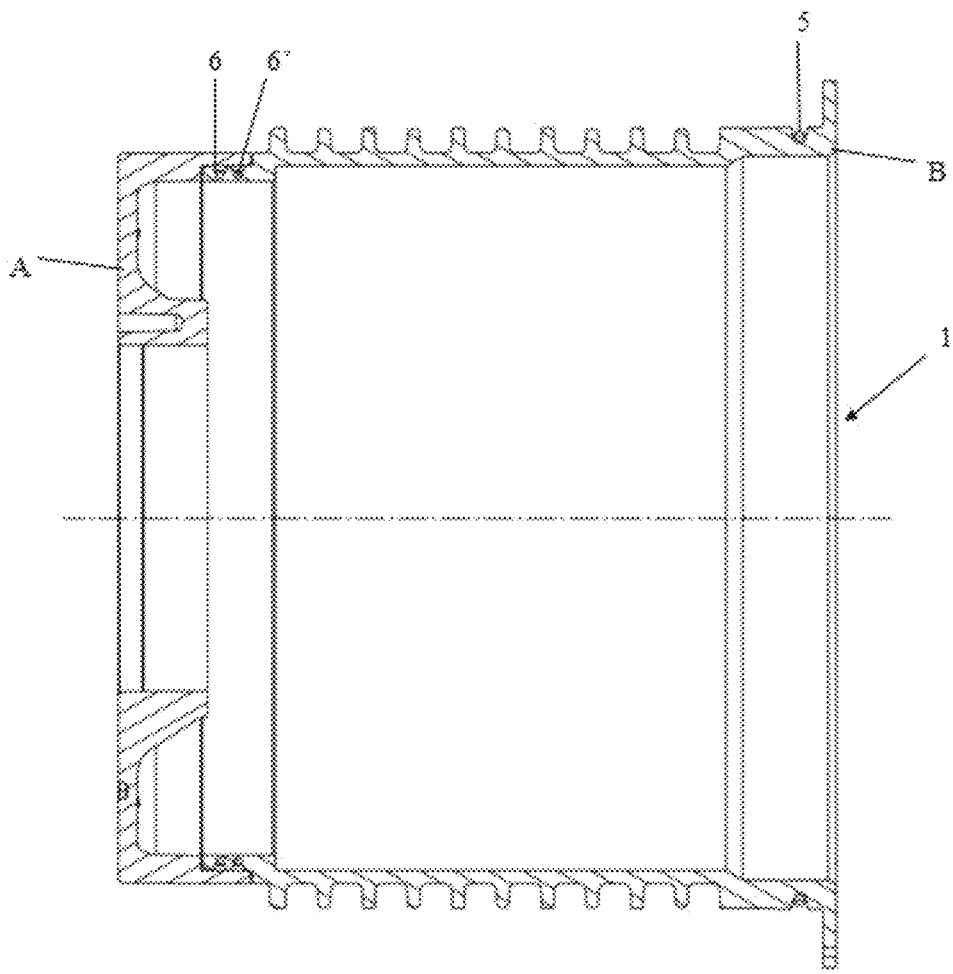
FIG. 5 is a cross-sectional view of the cooling jacket according to the embodiment of the invention.

A cooling jacket for cooling the permanent magnet synchronous electric motor (PMSM) in order to increase the heat transfer from the electric motor to the coolant, increase the heat transfer coefficient and decrease the overall temperature of the electric motor cooling system according to an embodiment of the invention will be described in detail below.

As shown in FIGS. 3-10, the permanent magnet synchronous electric motor (PMSM) is provided with the cooling jacket in order to increase the heat transfer from the electric motor to the coolant, increase the heat transfer coefficient and decrease the overall temperature of the electric motor cooling system according to this embodiment of the invention comprises a stator outer housing 2 substantially in the form of a hollow cylinder surrounding the cooling jacket 1 according to the invention which is also substantially in the form of a hollow cylinder; a stator core 3 in the form of a hollow cylinder located inside the cooling jacket 1 and made of steel sheets, a plurality of electrical wires wound about the stator core 3 to form electrical windings; and a rotor 4 is rotatably mounted inside the stator core 3.

The stator outer housing 2 has an end portion configured to form a bearing housing 22 of the motor. According to another embodiment, the bearing housing 22 may be manufactured as a separate unit. The concave groove 23 is formed in the inner surface of the stator outer housing 2 to guide the coolant toward the front surface of the bearing housing cooling portion A.

Cooling jacket 1 comprises a bearing coolant guiding channel 10, and a stator coolant guiding channel 14 located between the cooling jacket 1, and a stator outer housing 2 and the O-rings 5, 6, and 6' that seals the coolant. The stator outer housing 2 has an inner surface that is configured to contact with the outer surface of the cooling jacket 1. The configuration of the cooling jacket 1 will be described in more detail below.

As shown in FIGS. 5-10, the cooling jacket 1 for cooling the permanent magnet synchronous electric motor (PMSM)

in order to increase the heat transfer from the electric motor to the coolant, increase the heat transfer coefficient and decrease the overall temperature of the electric motor cooling system according to the embodiment of the invention comprises a bearing housing cooling portion A and a stator cooling portion B and O-rings 5, 6, and 6'.

The bearing housing cooling portion A is disposed to surround the bearing housing 22 of the stator outer housing 2 and manufactured separately from the stator cooling portion B, this separately manufacturing is for the purpose of decreasing the noise and vibration. The bearing housing cooling portion A is secured with the stator cooling portion B to form an unitary unit with two O-ring 6 and 6' that seals between the bearing housing cooling portion A and the stator cooling portion B to prevent the coolant from being leaked. The number of O-rings is not limited to this embodiment and the number of O-rings other than two may be used.

Figure 14:
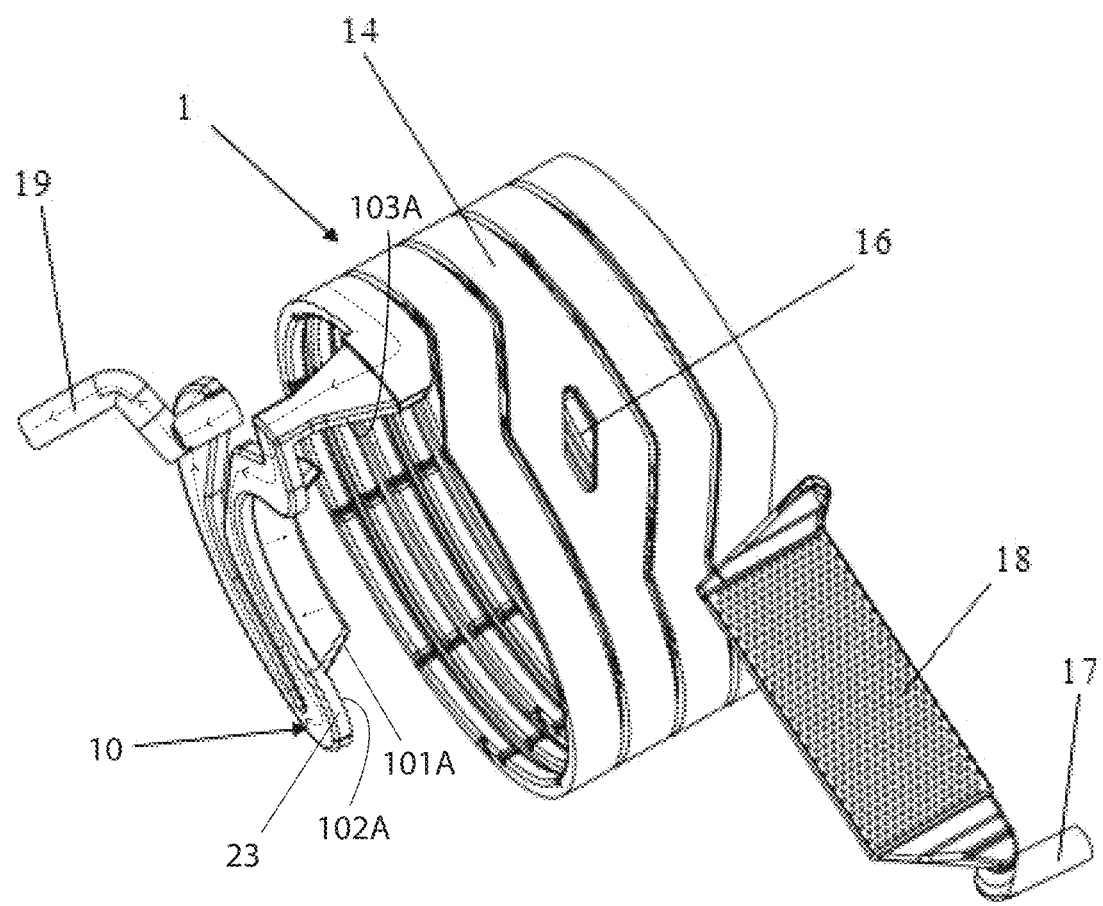
FIG. 14 is a schematic perspective view showing the flow path of the coolant through the cooling jacket according to the embodiment of the invention.

The bearing housing cooling portion A has an outer wall 9 located on the outer end side (i.e., the left side in the figure) and the bearing coolant guiding channel 10. According to the preferred embodiment shown in FIGS. 3-14, the outer wall 9 may have the same height as that of the bearing coolant guiding channel 10. Referring to FIG. 14, the bearing coolant guiding channel 10 may pass across the outer wall 9 toward the front surface 102A of the bearing housing cooling portion A. The front surface 102A of the bearing housing cooling portion A is provided with an arc-shaped groove 101A so that the coolant, after flowing across the outer wall 9 toward the front surface 102A of the bearing housing cooling portion A, may flow into the arc-shaped groove 101A to increase the bearing housing 22 cooling effect. The concave groove 23 in the inner surface of the stator outer housing 2, the circumferential surface 103A of the bearing housing cooling portion A, the front surface 102A of the bearing housing cooling portion A, and the arc-shaped groove 101A together forming the bearing coolant guiding channel 10. The coolant, after flowing through the bearing coolant guiding channel 10, may be discharged to the outside through the coolant discharging pipe 19.

However, the present invention is not limited to this embodiment. According to an embodiment, the bearing coolant guiding channel 10 is a portion that has a lower height than that of the outer wall 9, and is disposed between the outer wall 9 and the inner wall 12 of the stator cooling portion B. The bearing coolant guiding channel 10 runs along the circumference of the bearing housing cooling portion A.

Figure 6:
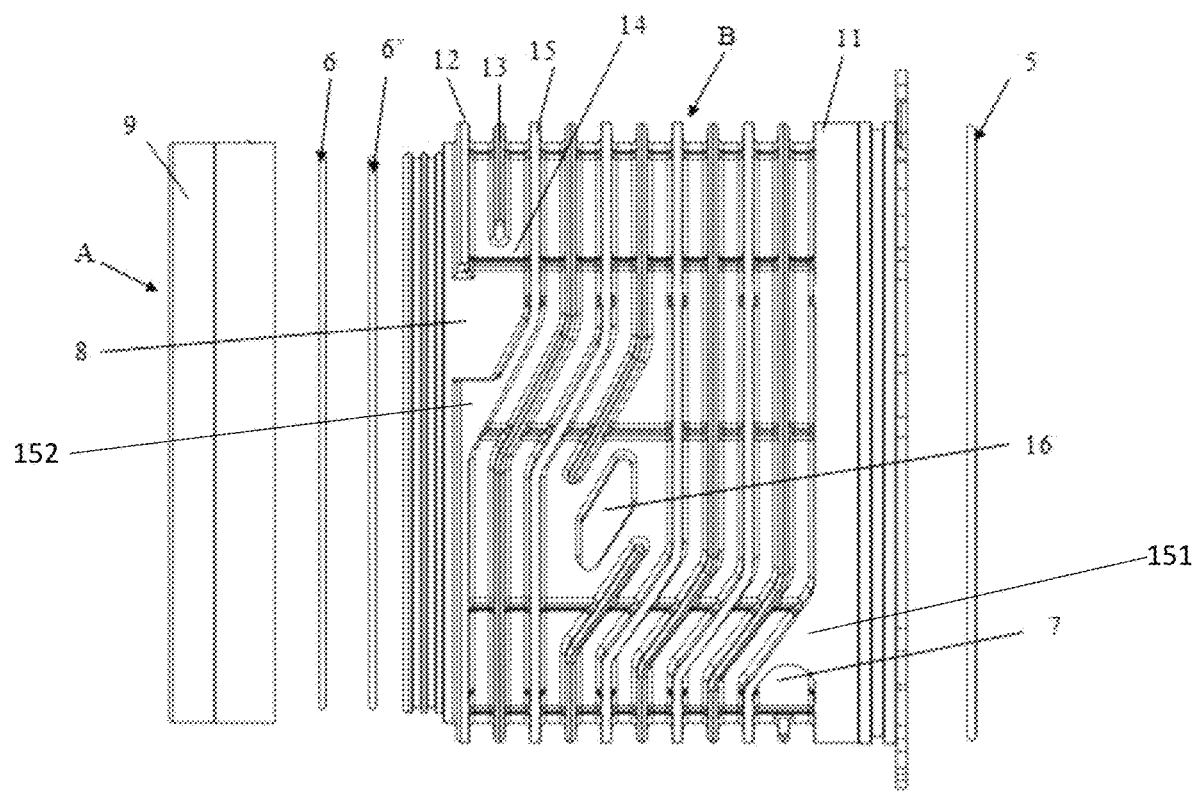
FIG. 6 is an exploded elevational view of the cooling jacket according to the embodiment of the invention.
Figure 7:
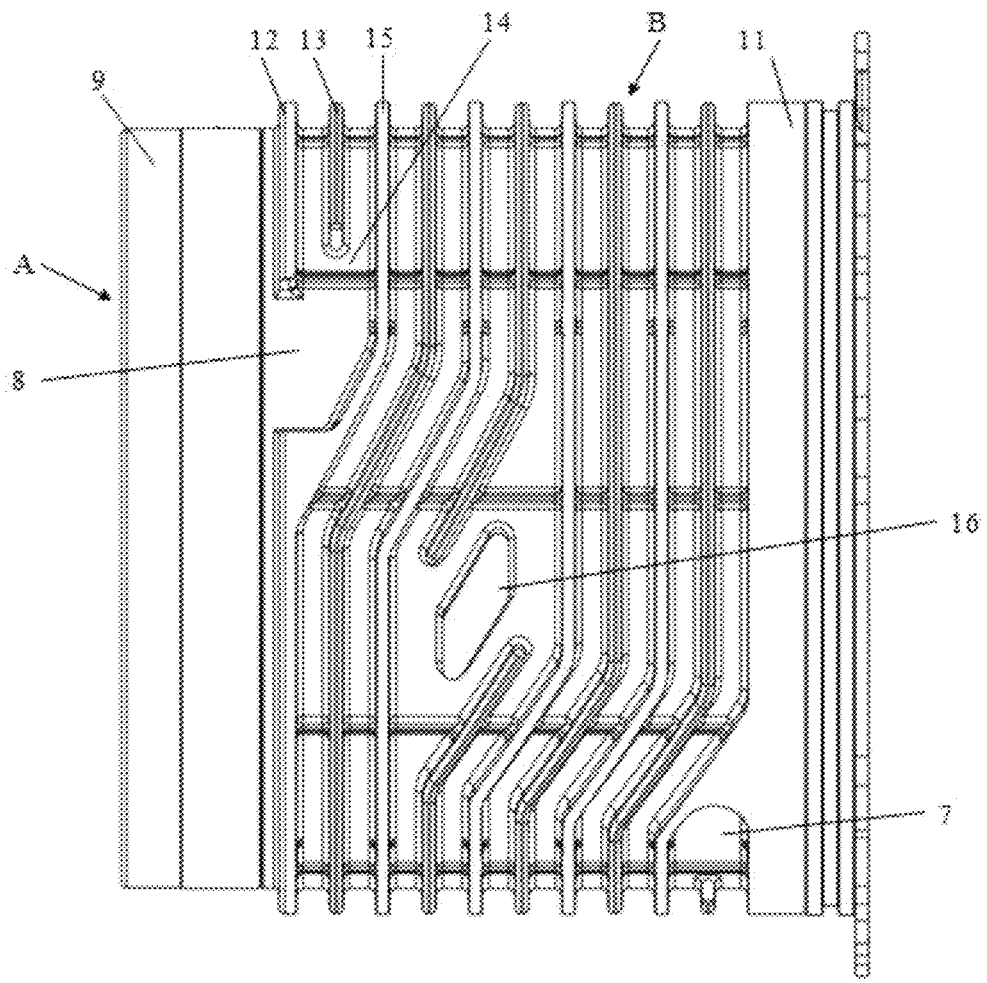
FIG. 7 is an elevational view of the cooling jacket according to the embodiment of the invention.
Figure 8:
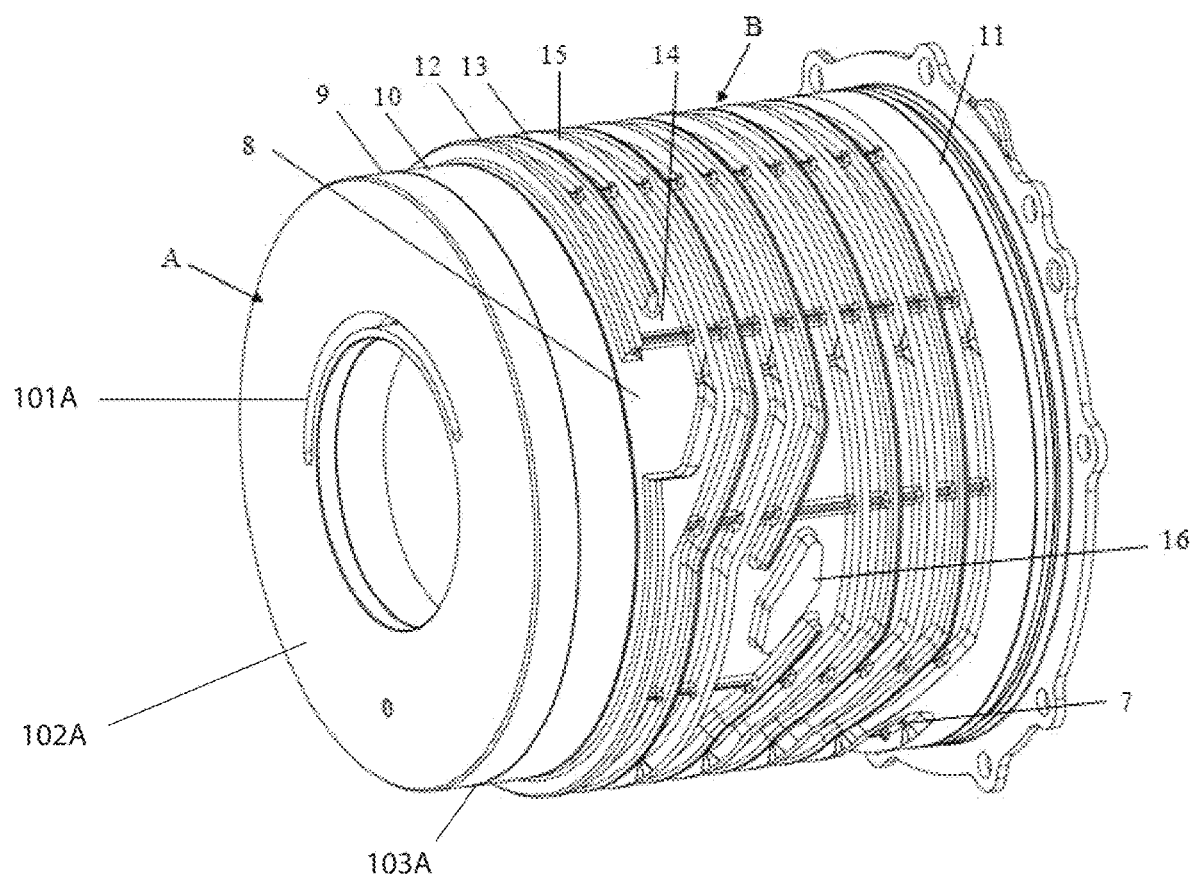
FIG. 8 is a perspective view of the cooling jacket according to the embodiment of the invention.
Figure 9:
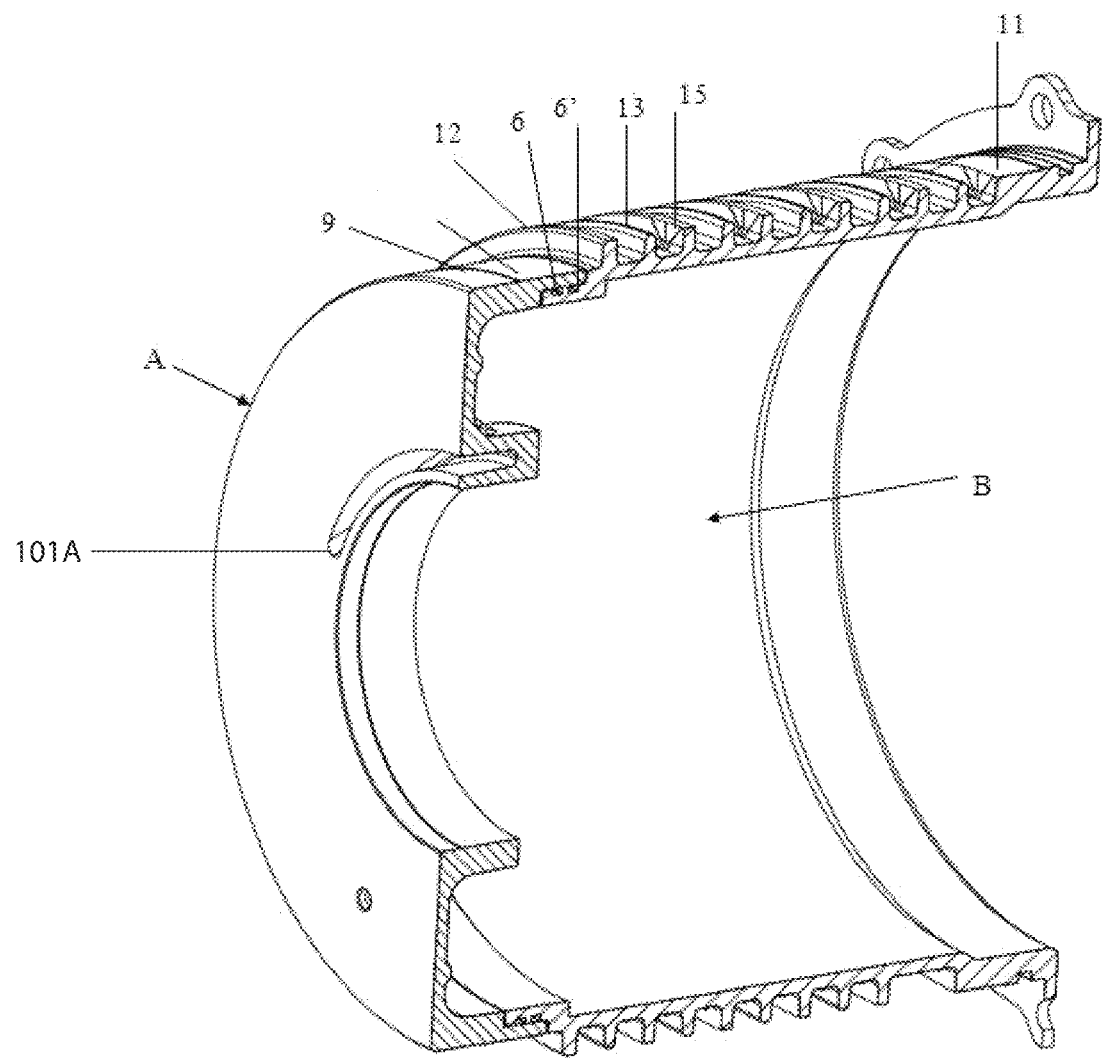
FIG. 9 is a partial perspective view of the cooling jacket according to the embodiment of the invention.
Figure 10:
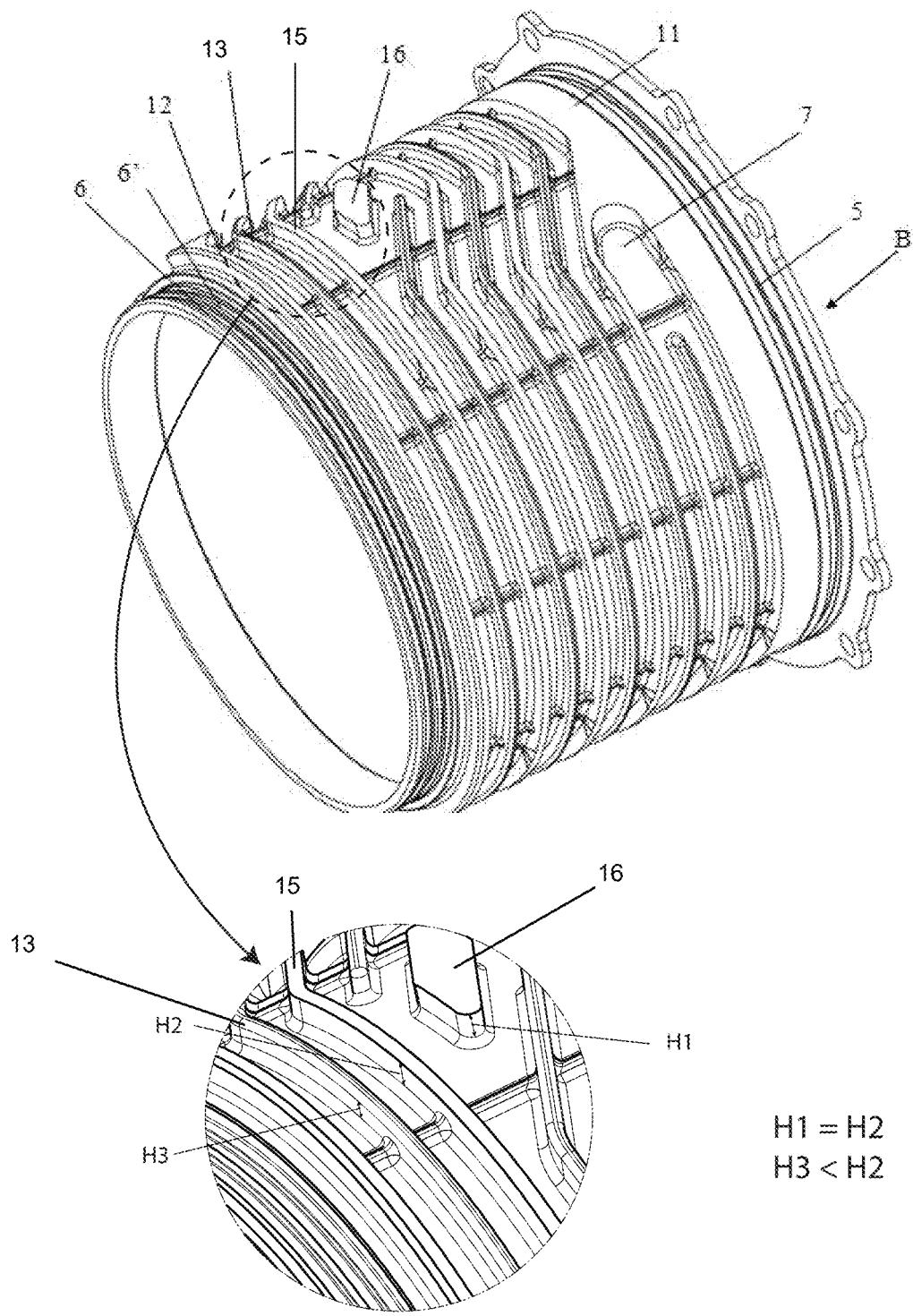
FIG. 10 is a perspective view of the stator cooling portion of the cooling jacket according to the embodiment of the invention.
Figure 11:
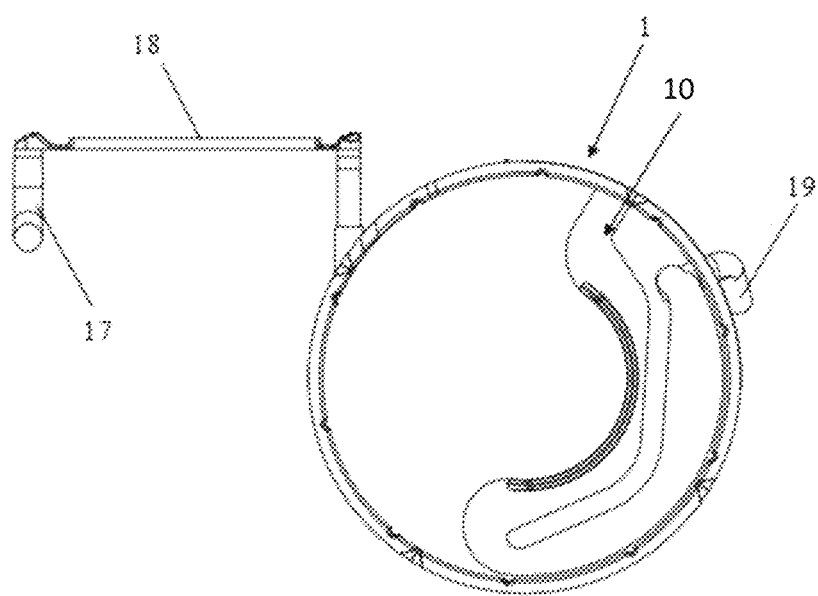
FIG. 11 is a schematic side view showing the flow path of the coolant through the cooling jacket according to the embodiment of the invention.
Figure 12:
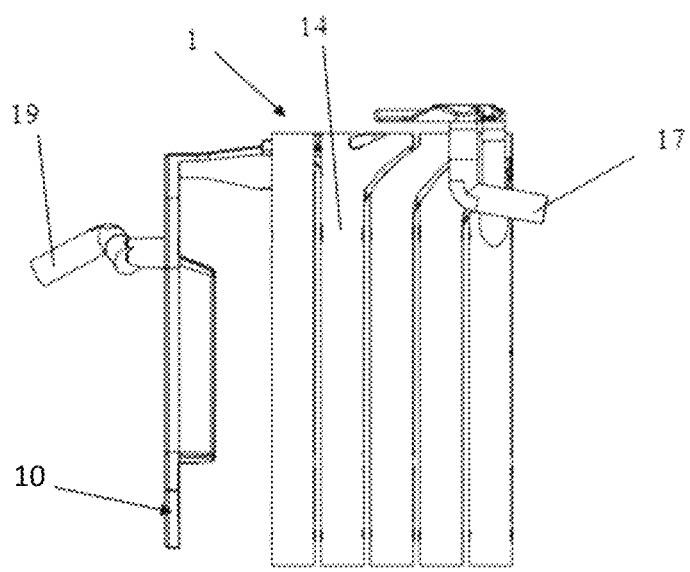
FIG. 12 is a schematic elevational view showing the flow path of the coolant through the cooling jacket according to the embodiment of the invention.
Figure 13:
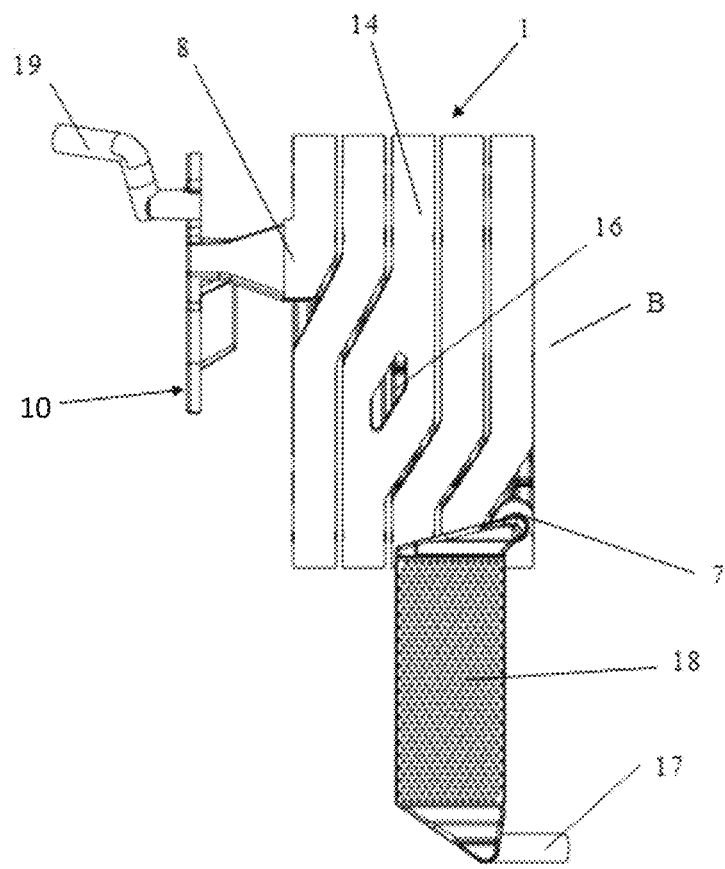
FIG. 13 is a schematic elevational view showing the flow path of the coolant through the cooling jacket according to the embodiment of the invention, at a viewing angle of 90 degrees relative to FIG. 12.

Referring to FIGS. 6-8, the stator cooling portion B comprises an outer wall 11 located on the outer end side (i.e., the right side in the figure) and an inner wall 12 located on the inner end side, the partition wall 15 extends in the spiral shape around the circumference of the stator cooling portion B, and is connected with the outer wall 11 and the inner wall 12 at one end 151 and the other end 152, respectively, wherein the partition wall 15 is in hermetically contact with the inner surface of the stator outer housing 2 so that the coolant cannot pass through and together forming a stator coolant guiding channel 14.

The stator coolant guiding channel 14 extends from the coolant inlet 7 to the coolant outlet 8. The outlet of coolant 8 is connected with the bearing coolant guiding channel 10 of the bearing housing cooling portion A. The middle section of the stator coolant guiding channel 14 is enlarged, at the middle of the enlarged section there is provided a flow splitter 16 having a shape that corresponds to the enlarged middle section. According to an embodiment, the middle section of the stator coolant guiding channel 14 is enlarged, the enlarged section is substantially in the diamond form when being viewed in the radial direction. At the middle of the enlarged section there is provided a flow splitter 16 that is substantially in the diamond form when being viewed in the radial direction. However, the present invention is not limited to this embodiment, and any other shapes, such as ellipse, may be used. The flow splitter 16 has a height equal to the height of the partition wall 15, the upper surface of the flow splitter 16 is curved to hermetically contact with the inner surface of the stator outer housing 2, thus the coolant cannot pass through (see the cross-section taken along I-I' in FIG. 4).

At the middle of the stator coolant guiding channel 14 there is provided a middle rib 13 that extends in the spiral shape around the circumference of the stator cooling portion B. The middle rib 13 comprises two portions which are a front rib portion and a rear rib portion. The front rib portion extends substantially parallel with the partition wall 15 from the coolant inlet 7 to a position located between the partition wall 15 and a side surface of the flow splitter 16. The rear rib portion extends substantially parallel with the partition wall 15 from a position located between the partition wall 15 and an opposite side surface of the flow splitter 16 to the coolant outlet 8.

The middle rib 13 has a lower height than the height of the partition wall 15. Preferably, the middle rib 13 has a lower height than the height of the partition wall 15 by 0.5 mm. Thereby, when the stator outer housing 2 is mounted to surround the cooling jacket 1, the radial distance from the top of the middle rib 13 to the inner surface of the stator outer housing is 0.5 mm.

The O-ring 5 form a seal between the stator cooling portion B and the stator outer housing 2 to prevent the coolant from being leaked.

FIGS. 11-14 is schematic views showing the flow path of the coolant through the cooling jacket according to the embodiment of the invention. In FIGS. 11-14, the physical components of the cooling jacket 1 such as the outer walls 9 and 11, the inner walls 12, the partition wall 15, and the flow splitter 16 have been omitted, only the flow path of the coolant is shown for ease of understanding.

As shown in FIGS. 11-14, when the permanent magnet synchronous electric motor using the cooling jacket 1 according to the invention operates, the coolant is introduced from the coolant feeding pipe 17, flows through the inverter cooling path 18 to the coolant inlet 7 of the cooling jacket 1, follows the stator coolant guiding channel 14 to the coolant outlet 8 in order to flow through the bearing coolant guiding channel 10 to the outside through the coolant discharging pipe 19.

According to an embodiment, the coolant exits the coolant outlet 8 of the stator cooling portion B, follows the bearing coolant guiding channel 10. Referring to FIG. 14, the coolant follows the bearing coolant guiding channel 10 may flow across the outer wall 9 toward the front surface of the bearing housing cooling portion A, flows into the arc-shaped groove 101A to increase the bearing housing 22 cooling effect, then continues to flow along the concave groove 23 in the front surface of the bearing housing cooling portion A and flows to the outside through the coolant discharging pipe 19. The fluid passage circulates in the aforementioned manner allows the coolant to flow from inlet to outlet with optimal velocity according to this configuration and takes away the heat via forced convection heat transfer mechanism.

The flow splitter which is substantially in the diamond form 16 is a very important aspect in the design of the cooling jacket for cooling the permanent magnet synchronous electric motor according to the invention. The shape of the flow splitter 16 that is substantially in the diamond form when being viewed in the radial direction is intended to enhance the turbulence level in the design with minimum pressure drop. The flow splitter 16 is in contact with the stator outer housing 2 while the middle ribs 15 are not. If the flow splitter 16 substantially in the diamond form when being viewed in the radial direction is not provided, the coolant guiding channel will become uneven. The enlarged coolant guiding channel generates the unenen flow distribution, results in higher pressure drop with the same heat transfer coefficient, thus consumes more power for pumping the coolant. In order to form an even coolant guiding channel, more partition walls is required, which results in the number of loops of the spiral guiding passage increasing, results in the higher pressure drop with the same heat transfer coefficient, thus consumes more power for pumping the coolant.

The middle ribs disclosed in the Chinese Utility Model No. CN208862672U and the Chinese Patent Application Publication No. CN105990945A are entirely different as compared to the design of the middle rib of the cooling jacket for cooling the permanent magnet synchronous electric motor according to the invention. The cooling jacket in the Chinese Utility Model No. CN208862672U has three middle ribs while the design of the cooling jacket for cooling the permanent magnet synchronous electric motor according to the invention has only one middle rib. In the Chinese Patent Application Publication No. CN105990945A, the middle ribs has different heights, which will give an entirely different effect on the heat transfer coefficient and pressure drop. All the coolant jackets substantially have the same design but the pressure drop and heat transfer coefficient makes them distinct, as the results of the number of cooling channels, channel width, channel height, and flow splitter.

The height of the middle rib of the cooling channel has a direct impact on pressure drop and turbulence level. Low height creates low turbulence level and less pressure drop. Higher height of the middle rib creates more turbulence due to smaller guiding passage and less cross-flow velocity and thus, the higher height of the middle rib increases the pressure drop. The pressure drop affects the pump capacity which affects the current drawn from the battery and hence affects the operation range of the vehicle. In fact, if the middle rib is going to be in contact with the stator outer housing then the pressure drop will be nearly double. The 0.5 mm gap from the top of the middle rib to the inner surface of the stator outer housing also affects the cross flow, due to small guiding passage, the increasing cross flow velocity enhances the heat transfer. The 0.5 mm gap is determined after many iterations of simulations and is selected such that it meets the pressure drop (pump capacity) requirement.

The middle rib is also disposed to increase the contact surface area with the coolant and hence increases the heat transfer and decrease the temperature. Through practice, the temperature by using the cooling jacket for cooling the permanent magnet synchronous electric motor according to the invention is reduced by 6° C. as compared to when using the known cooling jacket. The other concern is the pressure drop, the pressure drop will be certainly increased if the middle rib is also contact with the inner surface of the stator outer housing. Instead of creating a seal connection of the middle rib with the stator outer housing, a 0.5 mm gap is provided. Therefore, by providing such additional middle rib, the pressure drop will be maintained nearly same as when using the known cooling jacket.

According to the invention, a cooling jacket is provided for cooling the permanent magnet synchronous electric motor, thus increase the heat transfer from the electric motor to the coolant, increase the heat transfer coefficient and decrease the overall temperature of the electric motor cooling system. With the design of the cooling jacket for cooling the permanent magnet synchronous electric motor, the temperature of the motor is reduced by 6° C. by means of the more even flow path and the heat transfer coefficient.

The invention claimed is:

1. A cooling jacket for cooling a permanent magnet synchronous electric motor, wherein the permanent magnet synchronous electric motor comprises a stator outer housing substantially in a form of a hollow cylinder surrounding the cooling jacket which is also substantially in a form of a hollow cylinder; a stator core in a form of a hollow cylinder located inside the cooling jacket; and a rotor rotatably mounted inside the stator core, and the stator outer housing has an end portion configured to form a bearing housing of the motor, the cooling jacket comprising:
   a bearing housing cooling portion; and
   a stator cooling portion,
   wherein the stator cooling portion comprises an outer wall located on an outer end side and an inner wall located on an inner end side thereof, a partition wall that extends in a spiral shape around a circumference of the stator cooling portion, and the partition wall is connected with the outer wall and the inner wall at one end and other end of the partition wall, respectively, wherein the partition wall, the outer wall, and the inner wall are in hermetically contact with an inner surface of the stator outer housing and together form a stator coolant guiding channel,
   wherein a middle section of the stator coolant guiding channel is enlarged, at a middle of the enlarged middle section there is provided a flow splitter having a shape that corresponds to the enlarged middle section, the flow splitter has a same height as that of the partition wall, and a upper surface of the flow splitter is curved to form a seal with the inner surface of the stator outer housing, and
   wherein at a middle of the stator coolant guiding channel, the stator coolant guiding channel includes a middle rib that extends in a spiral shape around the circumference of the stator cooling portion, the middle rib comprises a front rib portion and a rear rib portion, wherein the front rib portion extends substantially parallel with the partition wall from a coolant inlet to a position located between the partition wall and a side surface of the flow splitter, the rear rib portion extends substantially parallel with the partition wall from a position located between the partition wall and an opposite side surface of the flow splitter to a coolant outlet, and the middle rib has a lower height than the height of the partition wall.

2. The cooling jacket according to the claim 1, wherein at least one O-ring is provided to form a seal between the bearing housing cooling portion and the stator cooling portion, and at least one O-ring is disposed to form a seal between the stator cooling portion and the stator outer housing.

3. The cooling jacket according to the claim 1, wherein the bearing housing cooling portion comprises:

an outer wall located on its an outer end side;

an arc-shaped groove formed in a front surface of the bearing housing cooling portion; and a concave groove formed in the inner surface of the stator outer housing, wherein the concave groove, a circumferential surface of the bearing housing cooling portion, the front surface of the bearing housing cooling portion, and the arc-shaped groove together form a bearing coolant guiding channel, wherein the coolant follows the bearing coolant guiding channel, flows across the outer wall toward the front surface of the bearing housing cooling portion, flows into the arc-shaped groove to increase the bearing housing cooling effect, then continues to flow along the concave groove in the front surface of the bearing housing cooling portion and passes through a discharging pipe to an outside.

4. The cooling jacket according to the claim 1, wherein the middle rib of the stator coolant guiding channel has a lower height than the height of the partition wall by 0.5 mm.

* * * * *